United States Patent
Keever et al.

(10) Patent No.: US 6,383,370 B1
(45) Date of Patent: May 7, 2002

(54) APPARATUS FOR TREATING WASTEWATER

(75) Inventors: Christopher S. Keever, Peachtree City, GA (US); Stephen Tarallo, Richmond, VA (US)

(73) Assignee: Infilco Degremont Inc., VA (US)

( * ) Notice: Subject to any disclaimer, the term of this patent is extended or adjusted under 35 U.S.C. 154(b) by 0 days.

(21) Appl. No.: 09/833,289

(22) Filed: Apr. 12, 2001

Related U.S. Application Data (60) Provisional application No. 60/232,981, filed on Sep. 14, 2000.

(51) Int. Cl.[7] ................................................. C02F 1/52
(52) U.S. Cl. .................... 210/96.1; 210/143; 210/195.3; 210/199; 210/202; 210/206; 210/208; 210/101
(58) Field of Search ................................ 210/101, 143, 210/195.3, 197, 199, 202, 206, 208, 96.1, 195.1

(56) References Cited

U.S. PATENT DOCUMENTS

| | | | |
|---|---|---|---|
| 3,350,302 A | 10/1967 | Demeter et al. ............ 210/713 |
| 4,139,456 A | 2/1979 | Yabuuchi et al. ............ 210/7 |
| 4,282,093 A | * 8/1981 | Haga et al. .................. 210/90 |
| 4,290,898 A | 9/1981 | von Hagel et al. ......... 210/738 |
| 4,320,012 A | 3/1982 | Palm et al. ................. 210/713 |
| 4,388,195 A | 6/1983 | von Hagel et al. ......... 210/709 |
| 4,465,597 A | 8/1984 | Herman et al. ............. 210/713 |
| 4,579,655 A | 4/1986 | Louboutin et al. ........ 210/195.3 |
| 4,724,085 A | 2/1988 | Pohoreski ................... 210/713 |
| 4,818,404 A | 4/1989 | McDowell .................. 210/603 |
| 4,855,061 A | * 8/1989 | Martin ........................ 210/709 |
| 4,927,543 A | 5/1990 | Bablon et al. .............. 210/711 |
| 5,112,499 A | 5/1992 | Murray et al. .............. 210/713 |
| 5,306,422 A | 4/1994 | Krofta ........................ 210/151 |
| 5,348,653 A | * 9/1994 | Rovel ......................... 210/605 |
| 5,441,634 A | 8/1995 | Edwards ..................... 210/194 |
| 5,601,704 A | * 2/1997 | Salem et al. ................. 210/86 |
| 5,730,864 A | 3/1998 | Delsalle et al. .......... 210/195.1 |
| 5,770,091 A | 6/1998 | Binot et al. ................. 210/711 |
| 5,800,717 A | 9/1998 | Ramsay et al. ............. 210/711 |
| 5,840,195 A | 11/1998 | Delsalle et al. ............. 210/713 |
| 6,126,838 A | 10/2000 | Huang et al. ............... 210/712 |
| 6,210,588 B1 | * 4/2001 | Vion ........................... 210/711 |
| 6,277,285 B1 | * 8/2001 | Vion ........................... 210/709 |

FOREIGN PATENT DOCUMENTS

| | | |
|---|---|---|
| DE | 43 33 579 A1 | 4/1995 |
| FR | 1411792 | 8/1995 |
| JP | 2001-79562 | 3/2001 |

OTHER PUBLICATIONS

Peter E. Moffa et al., *Retrofitting Control Facilities for Wet–Weather Flow Treatment*, EPA#/600/R–00/020, Jan. 2000.
ACTIFLOW Flow Diagram.
Biofor™ *Biological Aerated Filtration—Wastewater Treatment Technology for the 21st Century*, Infilco Degremont Inc., Sep. 1997.
DensaDeg® *High Rate Clarifier and Thickener*, Infilco Degremont Inc., Aug. 1997.

* cited by examiner

Primary Examiner—Peter A. Hruskoci
(74) Attorney, Agent, or Firm—Schnader Harrison Segal & Lewis LLP

(57) ABSTRACT

An apparatus for treating wastewater including a physical-chemical reactor; a chemical supply operably connected to the physical-chemical reactor; a clarifier operably connected to and located downstream of the physical-chemical reactor; a ballast recirculation line operably connected between the clarifier and the high rate physical-chemical reactor; and a control system that directs a) influent into 1) the clarifier but not the physical-chemical reactor when flow or pollutants of the influent is within a selected low range and 2) the physical-chemical reactor and then into the clarifier when the flow/pollutants of influent is within a selected higher range and b) internally generated ballast into the physical-chemical reactor through the ballast recirculation line when the pollutants and/or flow is within the selected higher range.

36 Claims, 9 Drawing Sheets

PRIOR ART

APPARATUS FOR TREATING WASTEWATER

This Application claims benefit of Provisional No. 60/232,981 filed Sep. 14, 2000.

FIELD OF THE INVENTION

This invention relates to an apparatus and method for treating wastewater, particularly to an apparatus and method for treating wastewater that is capable of handling not only ordinary, everyday flow rates and pollutants of wastewater, but also achieving similar or better treatment during surge periods and/or wet weather conditions.

BACKGROUND

In a typical wastewater treatment plant, wastewater is treated through a series of removal processes. One such removal process is settling or clarification. It is in this treatment step that many of the heavier solids (or materials with a specific gravity greater than one) are settled out of wastewater. It is typical for conventional clarifier basins to be sized for hydraulic settling rates of around 0.5 to 1.5 gpm/ft$^2$.

To produce a better clarifier effluent quality, chemically enhanced clarification-settling has been developed and implemented in many plants around the world. Coagulants and/or flocculants react and condition the influent water, which in turn increases the specific gravity of the incoming solids. These denser solids settle out more rapidly and, therefore, allow for more aggressive flow rates and smaller clarifier basins. One example of this technology is the Accelator® Clarifier.

To further assist in the settling of these particles, it is possible to add and/or recirculate a "ballast" material to mix with the incoming solids. This ballast material is typically sludge or sand. Unlike conventional clarifiers, these high rate clarification systems are of a significantly smaller footprint (possibly 5 to 10 times smaller), and they consistently produce equal or better quality effluent. The main drawback to ballasted high rate clarifiers is that they have higher operational costs, including increased power and maintenance costs, and chemical requirements. Examples of this technology include the DensaDeg® Clarifier or the Actiflo® Clarifier. It should be noted that because these high-rate clarifiers are of a significantly smaller footprint than conventional clarifiers, they cannot achieve conventional effluent quality without the use of chemicals, operating at the same flow rate.

A further problem facing existing wastewater treatment plants is that they have been sized to meet wastewater flow conditions, which may be completely inadequate during high flow occurrences, such as during heavy periods of rain. In such instances, the flow of wastewater may receive inadequate treatment, depending on the capacities and capabilities of the individual wastewater treatment plant. Some plants must bypass their treatment processes with this wet weather flow.

An alternative to address this situation is to provide for an increased size of the wastewater plant sufficient to handle such peak flows. However, in such instances, a significant, if not a majority of the capacity of the plant remains unused for the vast majority of the time. Clearly, this provides for serious inefficiencies and underutilization of facilities that are quite expensive from the standpoint of capital and operating cost.

A further alternative has been to construct storage basins/tunnels to essentially hold the peak wastewater volumes until the excess can be treated over the course of time. Again, this requires a significant capital commitment and also uses large areas/volumes of space, oftentimes which are not available because of space constraints.

Accordingly, it would be highly advantageous to provide a system and method capable of treating wastewater in a cost-efficient manner that can clarify normal design flow and pollutant levels, but also is flexible enough to handle peak events so as to avoid large storage facilities and maintain a small footprint.

SUMMARY OF THE INVENTION

The invention relates in one aspect to an apparatus for treating wastewater that includes a physical-chemical reaction vessel or reactor and a chemical supply operably connected to the physical-chemical reaction vessel. A clarifier operably connects to and is located downstream of the physical-chemical vessel. A ballast recirculation line is operably connected between the clarifier and the high rate physical-chemical vessel. Finally, the apparatus includes a control system that directs a) influent into 1) the clarifier but not the physical-chemical vessel when influent conditions are within a selected low range and 2) the physical-chemical vessel and then into the clarifier when the influent conditions are within a selected higher range, and b) ballast from the clarifier into the physical-chemical vessel through the sludge recirculation line when the flow or pollutant loading is within the selected higher range.

The invention also includes a method of treating a variable flow/pollutant loading of wastewater that includes removing selected materials from the wastewater. During a normal flow or pollutant loading of wastewater, the wastewater is typically 1) subjected to clarification in a clarifier without the use of coagulating/flocculating chemicals, 2) biological treatment and possibly 3) settling and/or filtration and/or disinfection. During an increased flow or loading of wastewater, 1) coagulant, and possibly flocculant, is added to the incoming wastewater, 2) ballast within the clarifier is recirculated into the resulting mixture, 3) the resulting mixture is subjected to agitation in a physical-chemical vessel, and 4) the resulting mixture is subjected to settling in the clarifier. Clarifier effluent may then be subjected to biological treatment, settling, filtration, and disinfection—or any combination thereof.

DETAILED DESCRIPTION OF THE INVENTION

The following description is intended to refer to specific embodiments of the invention illustrated in the drawings and is not intended to define or limit the invention, other than in the appended claims. Also, the drawings are not to scale and various dimensions and proportions are contemplated.

Figure 1:
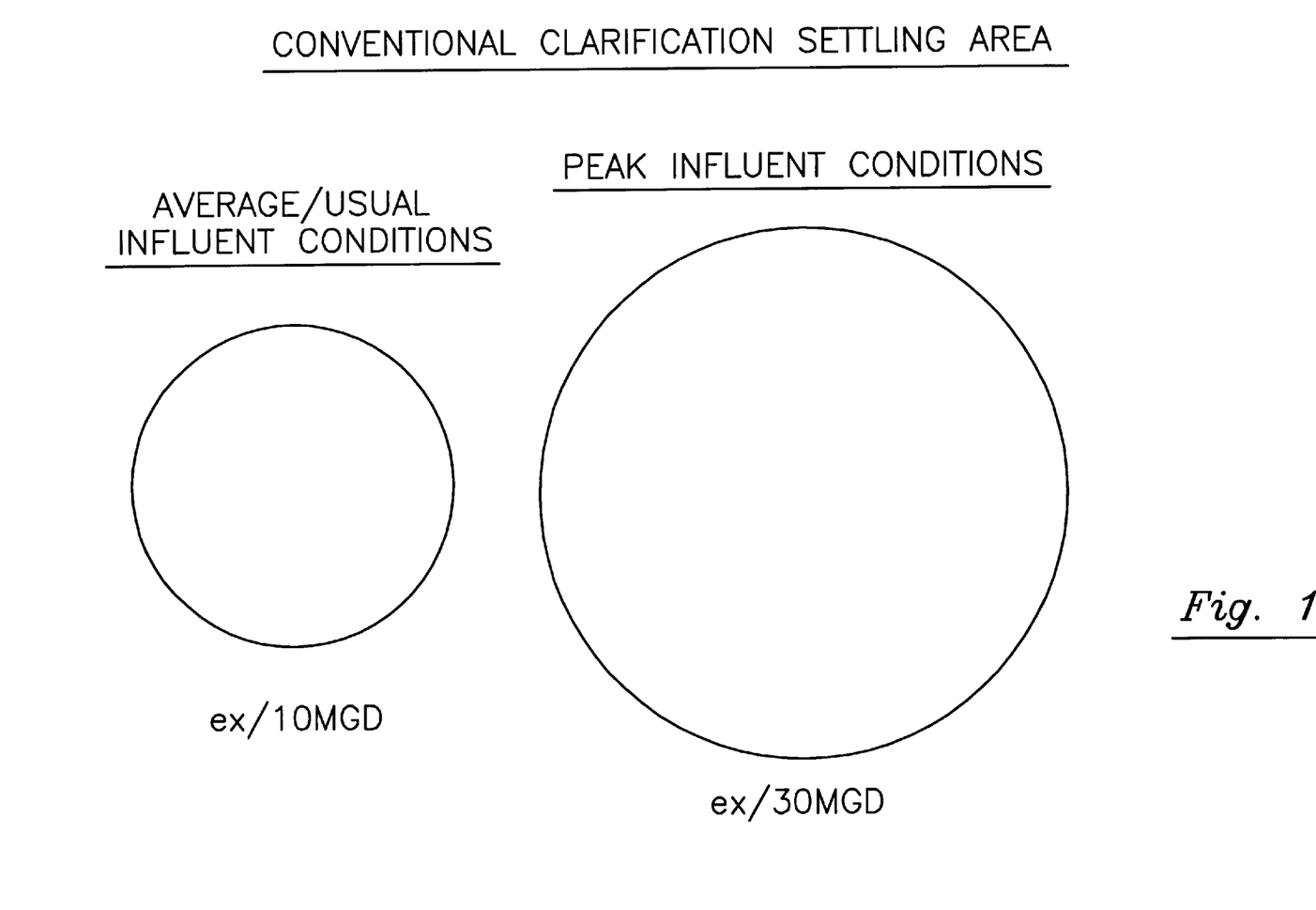
FIG. 1 is a simple depiction showing differences in "footprint" size of two clarifiers.

Currently, when a wastewater treatment plant is designed, it is recognized that the wastewater flow and/or pollutant loading entering the plant will likely fluctuate hourly, daily and seasonally as previously mentioned. These variations are typically accounted for by designing treatment processes with a level of conservatism, or redundancy, to allow for adequate treatment of the peak wastewater conditions. (This has, however, not always been true.) This design practice leads to the construction of clarifiers, filters and other treatment apparatus that are sized large enough to process peak wastewater flows and/or pollutant loadings, yet still achieve plant effluent discharge permit requirements. The greater the peak/average conditions ratio, the greater the costs of construction. This is illustrated in FIG. 1 by reference to the difference in footprint size that is caused by the need to increase capacity to meet a peak flow, for example.

Related to the design consideration of peak flow conditions is the phenomena of sewer infiltration (I&I), combined sewer overflows (CSO) and sanitary sewer overflows (SSO). Many municipalities currently have significant wet weather flows that cause process equipment to operate at hydraulic loading rates greater than those for which they were designed. It is not uncommon to see wastewater plants receive wet weather flow two (2) to more than four (4) times that of their average design flow. As a result, some processes/equipment are overloaded and cannot achieve the minimum level of treatment required to meet discharge permits.

One solution is to expand the size of the existing wastewater treatment facility to accommodate the excess flow. This is many times the case, either by the capacity upgrade of an existing facility, construction of bypass facilities, or the construction of an entirely new plant. Other common solutions include the construction of very large wet weather retention basins, and/or separation/refurbishment of the existing sewer system(s).

Figure 2:
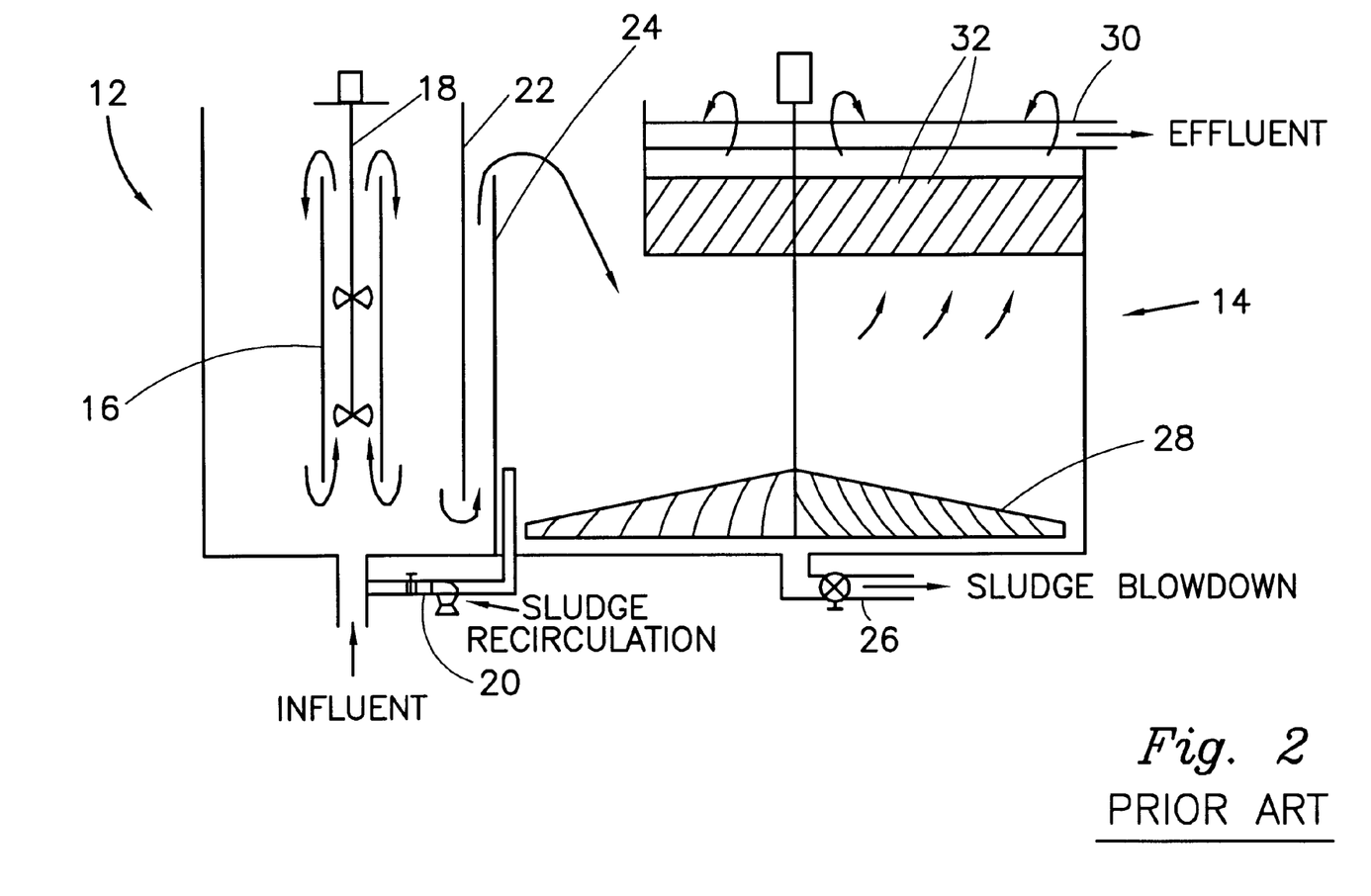
FIG. 2 is a schematic cross-section of a portion of alternative wastewater treatment technology utilizing physical-chemical apparatus to treat wastewater.

As noted above, and as municipalities weigh the options to address their peak flow treatment alternatives, implementing the use of physical-chemical clarification systems have proven economical and to achieve excellent effluent water quality. Additionally, these high rate systems can achieve this level of treatment in a small footprint, which is advantageous. Such a system is shown in FIG. 2, for example, wherein a reactor 12 and clarifier 14 comprise the primary zones. The reactor zone contains an internal recirculator 16 and an agitator 18 that causes intense mixing of the influent, flocculant (not shown), coagulant (not shown) and ballast (not shown) material with ballast recirculated through ballast recirculation line 20.

A baffle 22 separates the internal recirculator from wall 24 segregating reactor zone 12 from clarifier zone 14. Agitated influent passes between baffle 22 and wall 24 and into clarifier zone 14 whereby solids in the wastewater settle out. Clarified wastewater then rises upwardly through zone 32 at a hydraulic rise rate of about 20–80 gpm/ft$^2$, in most cases. Sludge is removed through a sludge removal line 26 after thickening and collection by rake 28. Effluent passes outwardly of the clarifier zone through effluent line 30 after rising past settling plates or tubes 32.

Because the hydraulic settling rates within the lamellar clarification zone are typically in the range of about 20 to 80 gpm/sq.ft., the clarifier/thickener zone is very small compared to conventional clarifiers.

Figure 3:
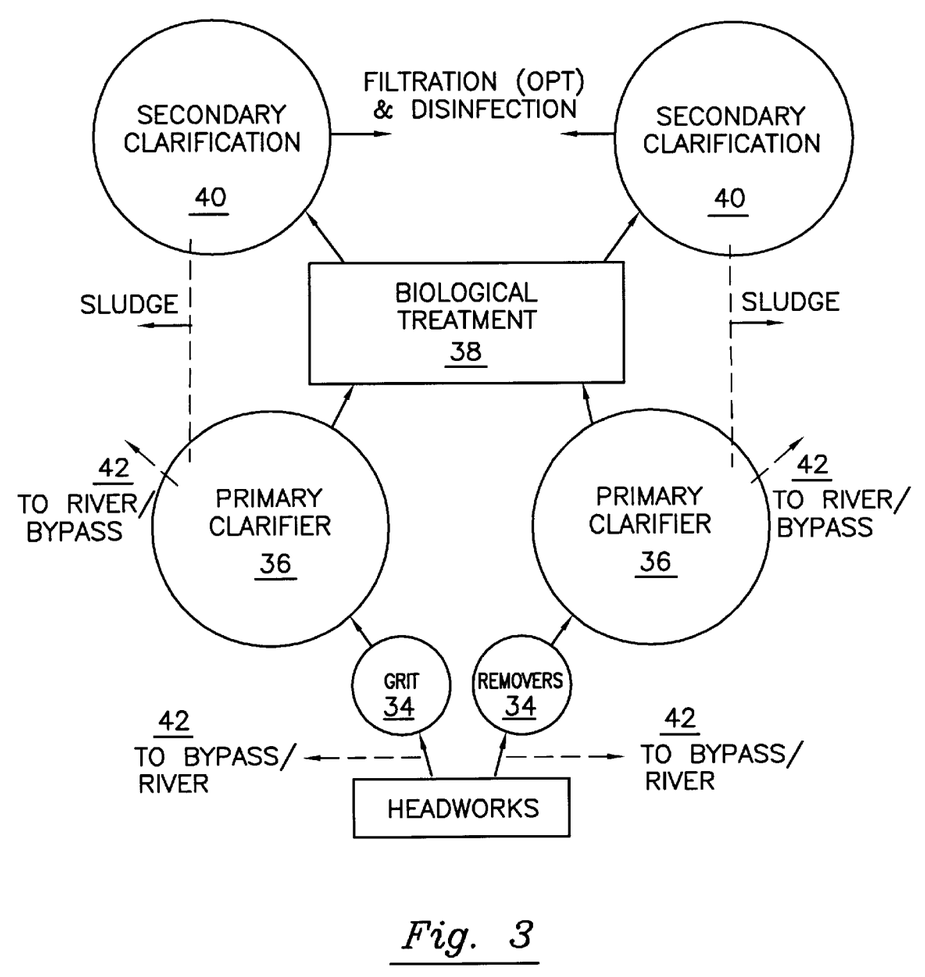
FIG. 3 is a schematic plan view of a typical wastewater treatment plant design.

An overview of a typical wastewater treatment plant (WWTP) is shown in FIG. 3. The wastewater treatment plant includes facilities for removing selected solid materials such as grit and other inert materials as shown in grit removers 34. Also, conventional clarifiers 36 are located downstream of grit removers 34 and a biological treatment apparatus 38 is located downstream of conventional clarifiers 36. Biological treatment device 38 is followed by, in this case, another pair of clarifiers 40.

Figure 4:
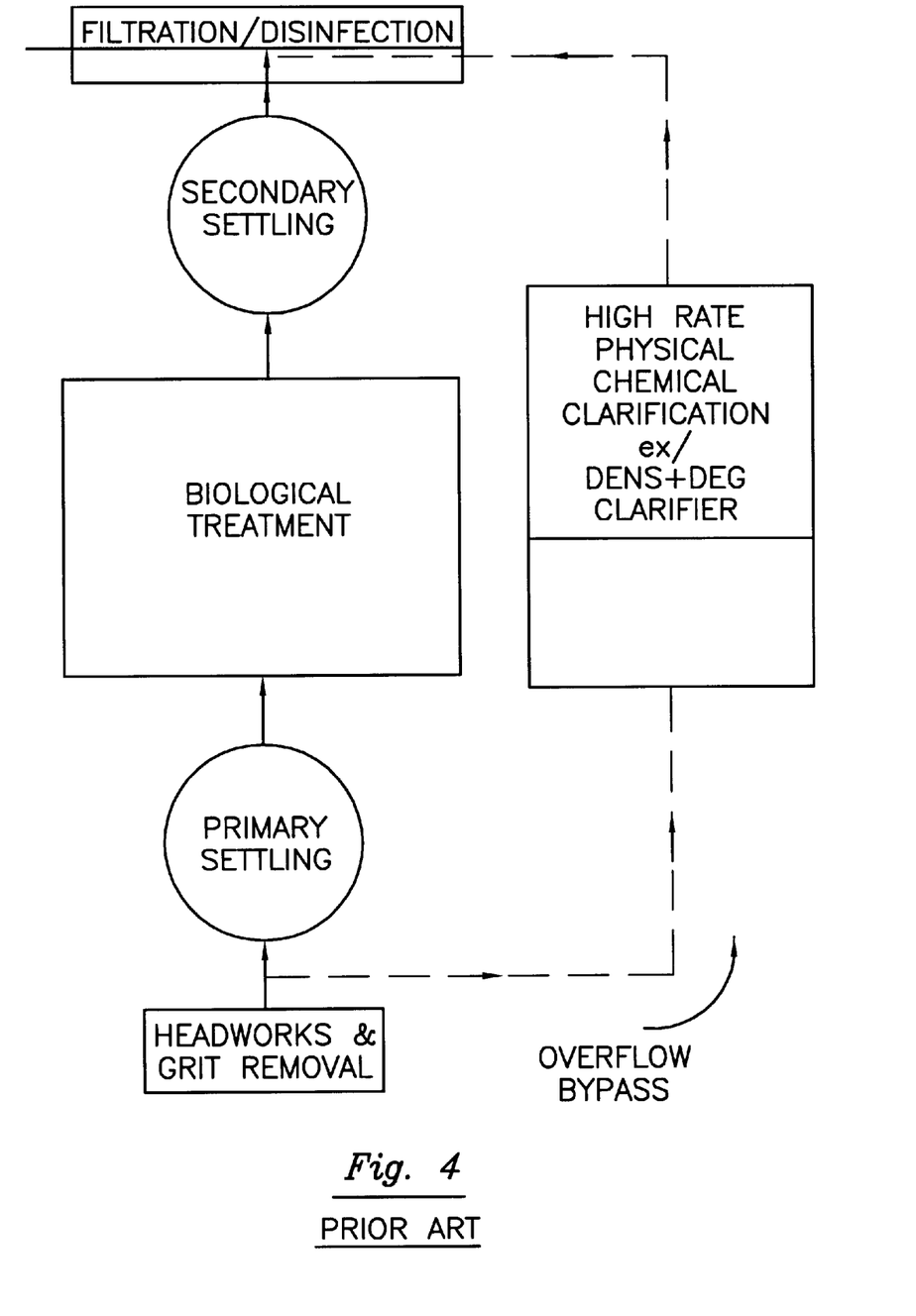
FIG. 4 is a schematic plan view of a wastewater treatment plant utilizing the physical-chemical apparatus shown in FIG. 2.

When municipalities implement high rate physical-chemical clarification to treat the peak hydraulic or pollutant conditions, design flow passes through clarifiers 36 followed by biological treatment, while the excess flow is diverted through the physical-chemical clarifier(s) (bypassing biological treatment). Such a system is shown in FIG. 4. Additionally, the high rate clarifier(s) must be started up, shut down and cleaned with every use, which is quite disadvantageous. In sharp contrast, the apparatus of the invention accomplishes both conventional settling and high rate clarification in one location and with one device-all without the disadvantages of the prior art systems.

Figure 5:
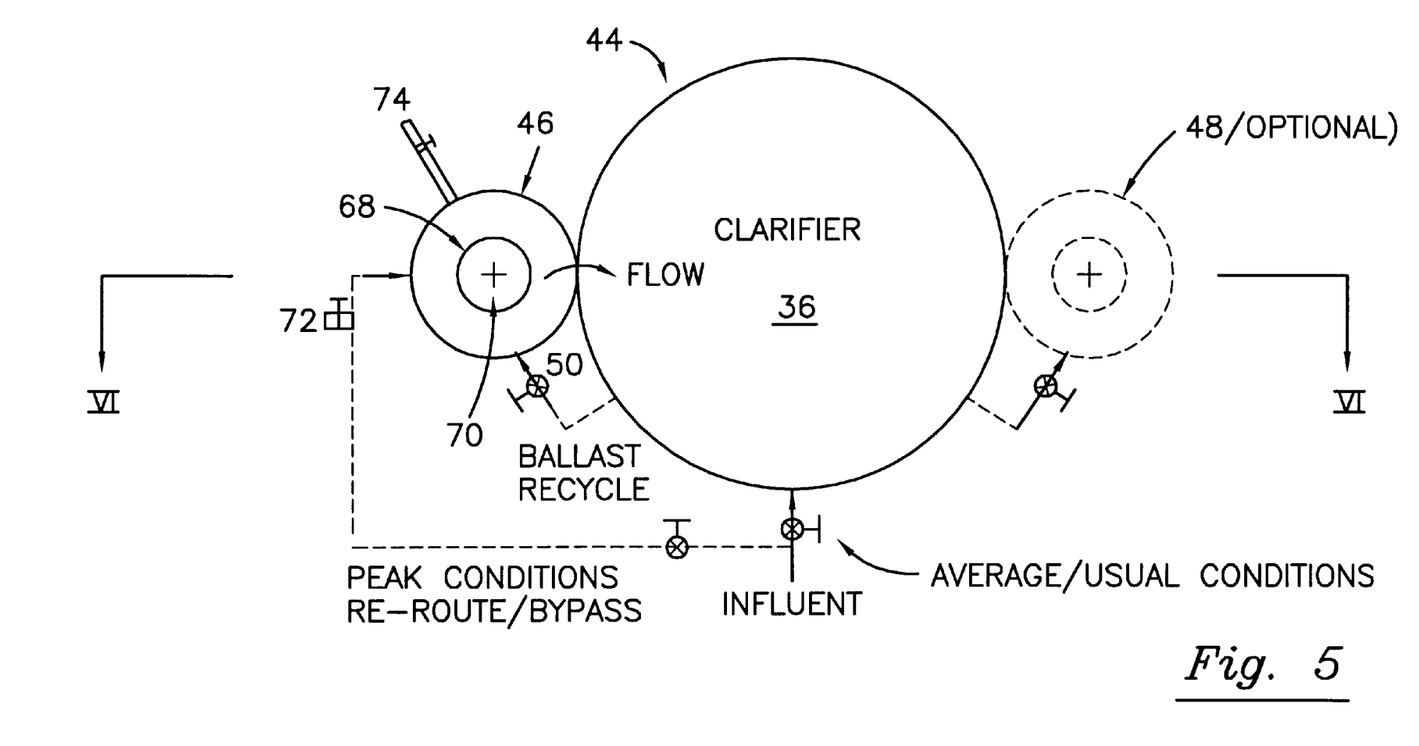
FIG. 5 is a schematic plan view of a portion of the wastewater treatment plant shown in accordance with the invention.
Figure 9:
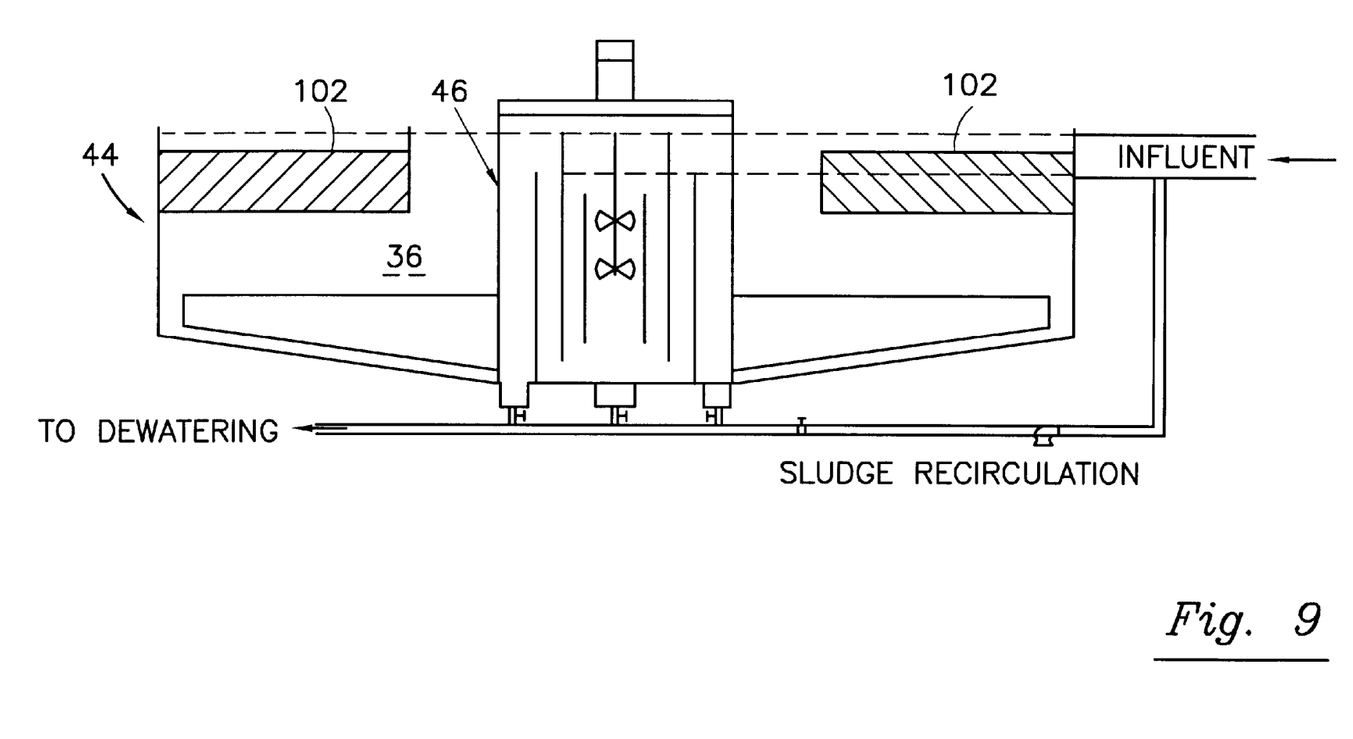
FIG. 9 is a cross sectional view of an alternative configuration/embodiment of the invention.

Referring now to FIG. 5, a device 44 is either substituted or retrofitted into an existing clarifier 36 such as that shown in FIG. 3. Thus, clarifier 36 of FIG. 5 is connected to a reactor/vessel 46. A ballast recirculation line 50 is provided directly from clarifier 36 to reactor 46. Also, although not shown in detail, a line or plurality of lines 72 and 74 provide coagulant, flocculant, and other reagents required for treatment. Depending on the clarification requirements, an additional reactor 48 and accompanying conduits, chemical supply and the like may be provided in one embodiment of the invention. Reactor 46 is located within clarifier 36 as shown in FIG. 9 and includes plate and/or tube settlers 102, in one embodiment of the invention.

Figure 6:
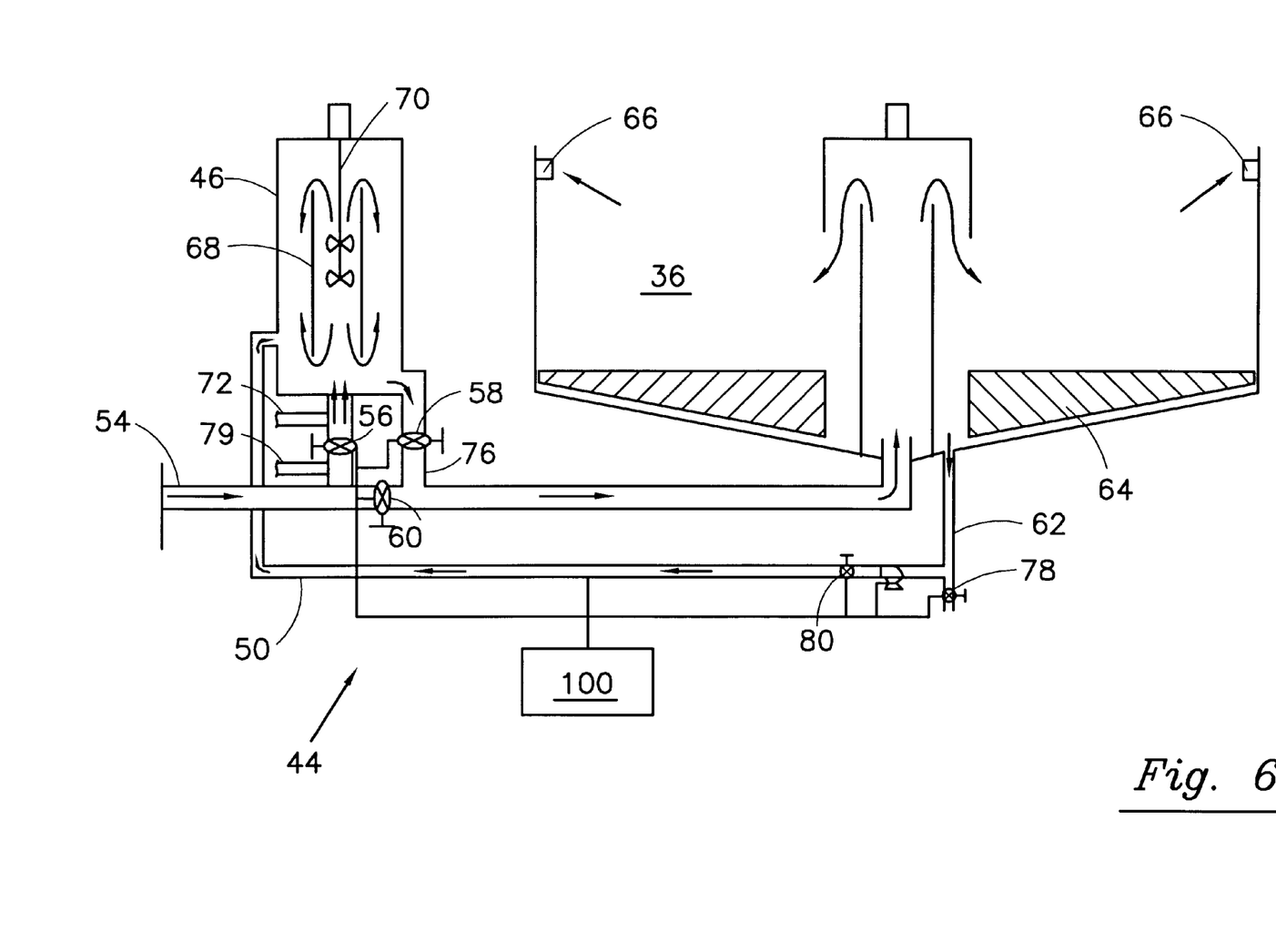
FIG. 6 is a cross-sectional view of the apparatus shown in FIG. 5 taken along the lines VI–VI.

FIG. 6 shows an exploded cross-sectional view of the device 44 shown in FIG. 5, wherein clarifier 36 ordinarily, during times of normal or low flow and/or pollutant conditions, receives its influent from conduit 54. During ordinary influent conditions, valves 56 and 58 are in the closed position and valve 60 is open so that influent may pass directly into clarifier 36 for settling in accordance with conventional design parameters. Sludge removal occurs in the usual manner through conduit 62 subsequent to movement by rake 64. Effluent exits in the normal manner by way of trough 66.

During increased flow or pollutant periods, such as an example where flow increases by greater than 2 times dry weather flow, and depending on the duration of such flow changes, valve 60 is placed in the closed position and valves 56 and 58 are opened so that influent is channeled into reactor/vessel 46, upwardly through internal recirculator 68 and agitated by agitator 70, with the inclusion of chemicals such as coagulant and flocculant by way of conduits 72 and 74, for example. Treated influent exits reactor 46 by way of conduit 76 and returns to conduit 54 for passage into clarifier 36. It should be noted that the inclusion of internal recirculator, 68, is optional. Thus, the system may operate with a single physical-chemical reactor with a single agitator 70.

Substantially simultaneously, ballast recirculation is provided for by fully or at least partially closing valve 78 and opening valve 80 so that sludge, which acts as internally generated ballast, recirculates through conduit 50 into reactor 46, preferably by pumping action.

Thus, by way of summary, during normal conditions, wastewater is directed into the clarification zone in clarifier 36 for conventional settling. Then, as flows or pollutants increase beyond a pre-determined level, operation is switched by a control system including the valves set forth above and, preferably a computer/controller 100 (see FIG. 6), from conventional settling to physical-chemical mode.

To accomplish this, the following occurs:
wastewater is re-routed through the reactor 46
coagulant is added to the influent upstream of reactor 46
flocculant may be added in reactor 46
reactor agitator 70 initiates
ballast is recycled from the clarifier 36 to the reactor 46
This re-routing process is shown in FIG. 6.

Figure 7:
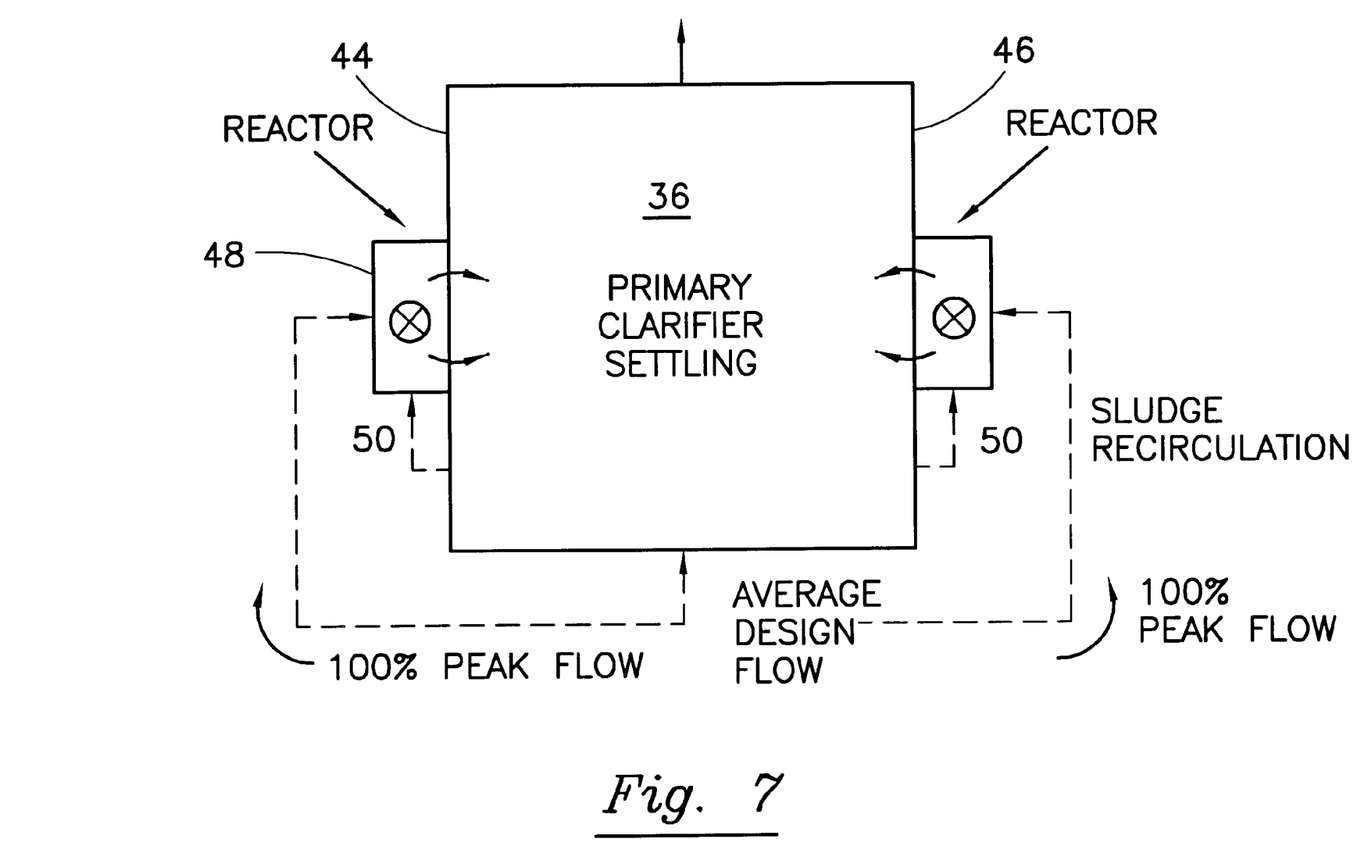
FIG. 7 is a schematic plan view of an alternative embodiment of a portion of the invention capable of performing similar functions as to that shown in FIGS. 5 and 6.

In the case of a new plant such as shown in FIG. 7, a similar configuration may be provided wherein average design flow enters into conventional clarifier 36 in the usual manner and exits in the usual manner. However, reactors 46 and 48 are provided to accommodate peak flow and pollutant conditions.

Thus, the invention offers significant benefits over conventional and side-stream clarification practices. One significant benefit lies in the fact that settling rates are much more conservative than those typically achieved within other physical-chemical clarifiers. Because the clarification zone is sized to achieve conventional effluent quality without the use of chemicals, the settling rate during physical-chemical mode is a substantially linear correlation to the plant's hydraulic peaking factor. For example, if a plant has a peaking factor of 3:1, the settling rate within clarifier 36 is three times the primary settling rate during peak conditions. It is not uncommon for physical-chemical clarifiers (FIG. 2) to function with clarification rise rates 10–20 times these conservative rates-and achieve excellent clarified water quality.

Figure 8:
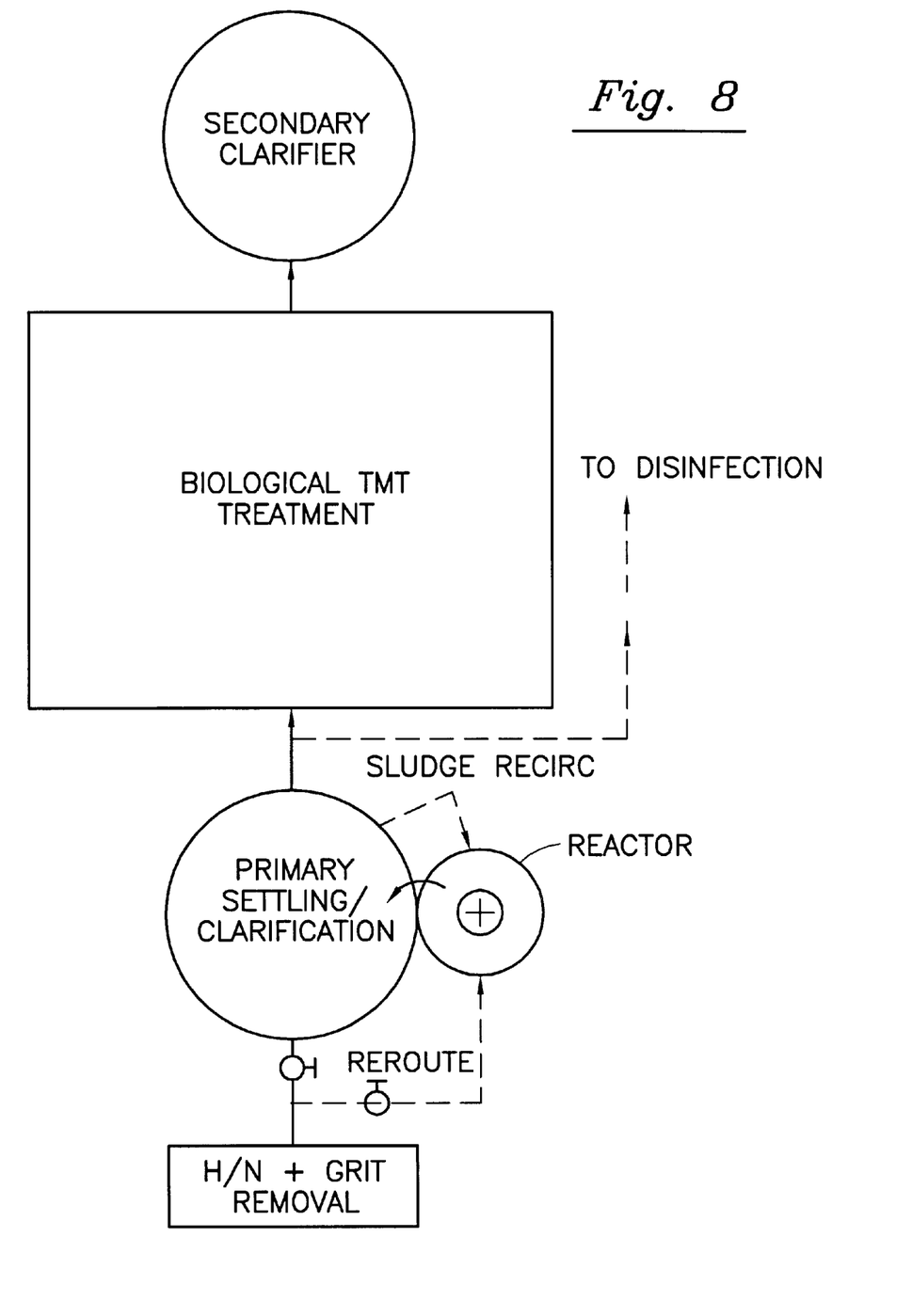
FIG. 8 is a schematic representation of a wastewater treatment plant in accordance with an especially preferred embodiment of the invention.

Another benefit of the invention lies in the passing of this better quality clarified effluent to the biological processes downstream, in one embodiment of the invention. Whereas typical primary clarification may produce a 150 mg/L BOD/ 150 mg/L TSS effluent, the invention may produce effluent qualities to as low as about 50/15 mg/L, respectively. This better clarifier effluent is then sent on for biological treatment. If the biological processes downstream cannot hydraulically accept a certain higher level of flow, a portion of the effluent may be diverted around the biological processes within the plant as shown in FIG. 8. At its worst, the quality of this bypass stream is equal to that achieved in a side stream high rate physical-chemical clarification system.

There are also start-up and shutdown advantages associated with the invention. Unlike a high rate clarification system operating in a bypass mode, the invention is always in a state of operation. Ballast, typically in the form of sludge, is already available for recirculation into the reactor/vessel because the clarification zone has been operating as a conventional clarifier. Thus, by using internally generated ballast, there is no need to supply ballast, such as microsand, for example, from outside. Start up of the unit for peak capacity is substantially immediate. The same is true for shutting down the reactor/vessel. An operator simply re-routs the flow back to the clarifier zone, and drains down the reactor/vessel.

In summary, at least the following benefits/advantages may be associated with the invention:
flexible and easy operation
excellent clarification effluent quality
small footprint
reduced operation and maintenance costs, including power, chemicals, and general maintenance
easy start-up and shut down
improved process controllability
no external ballast material(s) required for operation
reduced sludge piping/transport
thickened sludge may be sent directly to digester
cost reduction in capital outlays
smaller, less costly downstream biological processes Although this invention has been described with reference to specific forms of apparatus and method steps, it will be apparent to one of ordinary skill in the art that various equivalents may be substituted, the sequence of steps may be varied, and certain steps may be used independently of others, all without departing from the spirit and scope of the invention defined in the appended claims.

What is claimed is:
1. An apparatus for treating wastewater comprising:
a physical-chemical reactor;
a chemical supply operably connected to the physical-chemical reactor;
a clarifier operably connected to and located downstream of the physical-chemical reactor;
a ballast recirculation line operably connected between the clarifier and the physical-chemical reactor; and
a control system that directs
  a) influent into 1) the clarifier but not the physical-chemical reactor when influent conditions are within a selected range and 2) the physical-chemical reactor and then into the clarifier when the influent conditions are within a selected different range,
  b) ballast generated within the clarifier into the physical-chemical reactor through the ballast recirculation line when the influent conditions are within the selected different range, and
  c) chemicals to the physical-chemical reactor, either directly or indirectly, wherein the control system comprises: a reactor inlet valve positioned upstream of the physical-chemical reactor; a reactor outlet valve positioned downstream of the physical-chemical reactor, but upstream of the clarifier; a redirection valve positioned to direct influent into the clarifier when the influent conditions are within a selected low range and redirect influent to the reactor when the influent conditions are within a selected higher range; a recirculation valve positioned in the sludge recirculation line; and a computer/controller connected to the valves to control their respective operation.

2. The apparatus of claim 1, further comprising a device for removing selected solid materials from the wastewater operably connected to and positioned downstream of the physical-chemical reactor.

3. The apparatus of claim 1, wherein the physical-chemical reactor comprises a main reactor tank, an agitator, and, optionally, an internal recirculator.

4. The apparatus of claim 1, wherein the chemical supply comprises a coagulant supply and/or a flocculant or other reagent supply.

5. The apparatus of claim 4, wherein the coagulant supply is combined with the influent prior to introduction into the physical-chemical reactor.

6. The apparatus of claim 1, wherein the clarifier is adapted to operate without addition of externally supplied ballast to the physical-chemical reactor and/or the clarifier.

7. The apparatus of claim 1, wherein the wastewater exits the clarifier, either during the selected range or the selected different range.

8. The apparatus of claim 1, wherein the clarifier is a primary clarifier.

9. The apparatus of claim 1, wherein the selected range is up to normal design flow rate or pollutant loading.

10. The apparatus of claim 1, wherein the selected different range is higher than a normal maximum design flow rate or pollutant loading.

11. The apparatus of claim 1, wherein the selected different range is a preselected flow or pollutant range having a duration exceeding a preselected time period.

12. The apparatus of claim 1, wherein the clarifier further comprises plate or tube settlers.

13. An apparatus for treating wastewater which operates without introducing ballast material supplied from outside comprising:
   a physical-chemical reactor;
   a chemical supply operably connected to the physical-chemical reactor;
   a clarifier operably connected to and located downstream of the physical-chemical reactor; and
   a control system that directs
      a) influent into 1) the clarifier but not the physical-chemical reactor when influent conditions are within a selected range and 2) the physical-chemical reactor and then into the clarifier when the influent conditions are within a selected different range, and
      b) chemicals to the physical-chemical reactor, either directly or indirectly, when the influent conditions are within the selected different range, wherein the control system comprises: a reactor inlet valve positioned upstream of the physical-chemical reactor; a reactor outlet valve positioned downstream of the physical-chemical reactor, but upstream of the clarifier; a redirection valve positioned to direct influent into the clarifier when the influent conditions are within a selected low range and redirect influent to the reactor when the influent conditions are within a selected higher range; and a computer/controller connected to the valves to control their respective operation.

14. The apparatus of claim 13, further comprising a device for removing selected solid materials from the wastewater operably connected to and positioned downstream of the physical-chemical reactor.

15. The apparatus of claim 13, wherein the physical-chemical reactor comprises a main reactor tank, an agitator and, optionally, an internal recirculator.

16. The apparatus of claim 13, wherein the chemical supply comprises a coagulant supply and/or a flocculant or other reagent supply.

17. The apparatus of claim 16, wherein the coagulant supply is combined with the influent prior to introduction into the physical-chemical reactor.

18. The apparatus of claim 13, wherein the clarifier is adapted to operate without addition of externally supplied ballast to the physical-chemical reactor and/or the clarifier.

19. The apparatus of claim 13, wherein the wastewater exits the clarifier, either during the selected range or the selected different range.

20. The apparatus of claim 13, wherein the clarifier is a primary clarifier.

21. The apparatus of claim 13, wherein the selected range is up to an average design flow rate or pollutant loading.

22. The apparatus of claim 13, wherein the selected different range is higher than an average design flow rate or pollutant loading.

23. The apparatus of claim 13, wherein the selected different range is a preselected flow or pollutant range having an endurance exceeding a preselected time period.

24. The apparatus of claim 13, wherein the clarifier further comprises plate or tube settlers.

25. An apparatus for treating wastewater comprising:
   one physical-chemical reactor;
   a chemical supply operably connected to the physical-chemical reactor;
   a clarifier operably connected to and located downstream of the physical-chemical reactor; and
   a control system that directs
      a) influent into 1) the clarifier but not the physical-chemical reactor when influent conditions are within a selected range and 2) the physical-chemical reactor and then into the clarifier when the influent conditions are within a selected different range, and
      b) chemicals to the physical-chemical reactor, either directly or indirectly, when the influent conditions are within the selected different range, wherein the control system comprises: a reactor inlet valve positioned upstream of the physical-chemical reactor; a reactor outlet valve positioned downstream of the physical-chemical reactor, but upstream of the clarifier; a redirection valve positioned to direct influent into the clarifier when the influent conditions are within a selected low range and redirect influent to the reactor when the influent conditions are within a selected higher range; and a computer/controller connected to the valves to control their respective operation.

26. The apparatus of claim 25, further comprising a device for removing selected solid materials from the wastewater operably connected to and positioned downsteam of the physical-chemical reactor.

27. The apparatus of claim 25, wherein the physical-chemical reactor comprises a main reactor tank, an agitator, and, optionally, an internal recirculator.

28. The apparatus of claim 25, wherein the chemical supply comprises a coagulant supply and/or a flocculant supply.

29. The apparatus of claim 25, wherein the coagulant supply is combined with the influent prior to introduction into the physical-chemical reactor.

30. The apparatus of claim 25, wherein the clarifier is adapted to operate without addition of externally supplied ballast to the physical-chemical reactor and/or the clarifier.

31. The apparatus of claim 25, wherein the wastewater exits the clarifier, either during the selected range or the selected different range.

32. The apparatus of claim 25, wherein the clarifier is a primary clarifier.

33. The apparatus of claim 25, wherein the selected range is up to an average design flow rate or pollutant loading.

34. The apparatus of claim 25, wherein the selected different range is higher than an average design flow rate or pollutant loading.

35. The apparatus of claim 25, wherein the selected different range is a preselected flow or pollutant range having an endurance exceeding a preselected time period.

36. The apparatus of claim 25, wherein the clarifier further comprises plate or tube settlers.

* * * * *